United States Patent

[11] 3,573,861

[72] Inventor Dale S. Lecrone
 Jackson, Mich.
[21] Appl. No. 789,165
[22] Filed Jan. 6, 1969
[45] Patented Apr. 6, 1971
[73] Assignee Dawn Donut Company, Inc.
 Jackson, Mich.

[54] SELF-CLEANING FRYER APPARATUS
 7 Claims, 7 Drawing Figs.
[52] U.S. Cl. ..................................................... 99/404,
 99/408
[51] Int. Cl. ..................................................... A47j 37/12
[50] Field of Search ......................................... 99/403,
 404, 405, 408, 330, 336

[56] References Cited
 UNITED STATES PATENTS
2,652,767 9/1953 Childs .......................... 99/408

3,363,541 1/1968 Anetsberger .................. 99/408
3,376,806 4/1968 Magnusson .................... 99/408
 FOREIGN PATENTS
1,222,451 1/1960 France .......................... 99/408

Primary Examiner—Billy J. Wilhite
Attorney—Beaman & Beaman

ABSTRACT: A high production food fryer utilizing a heated liquid, such as shortening, wherein frying takes place within an elongated receptacle having a central heating portion and elongated recessed portions adjacent the lateral sides of the receptacle which define cold wells to receive crumbs and food particles dropping from a conveyor mechanism transporting food through the fryer. The frying liquid is continuously circulated and includes an output from the circulating means disposed adjacent the receptacle heating portion whereby the circulated frying liquid "flushes" the heating portion free of crumbs and food particles, washing the same into the cold wells of the receptacle.

PATENTED APR 6 1971
3,573,861
SHEET 1 OF 2
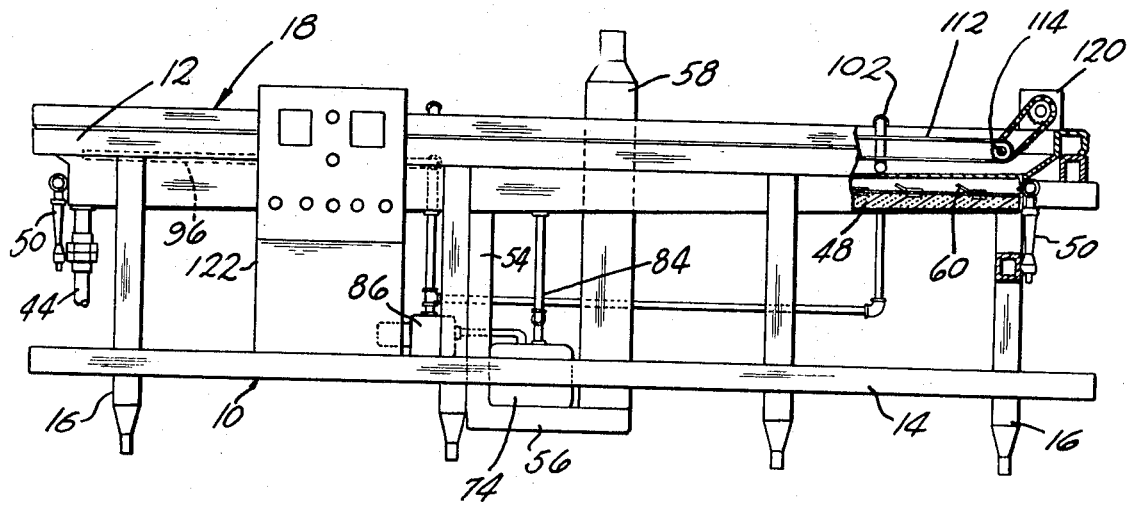
FIG. 1
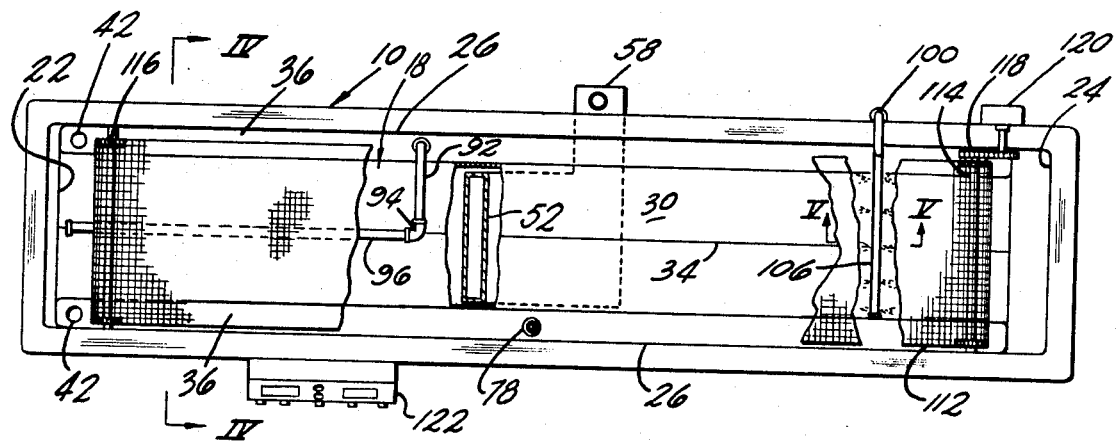
FIG. 2
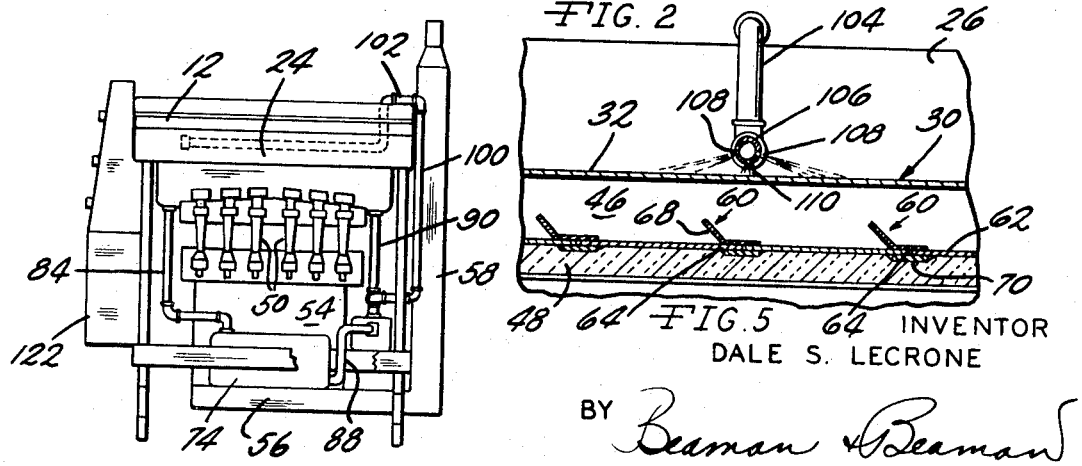
FIG. 3
FIG. 5
INVENTOR
DALE S. LECRONE
BY Beaman & Beaman
ATTORNEYS

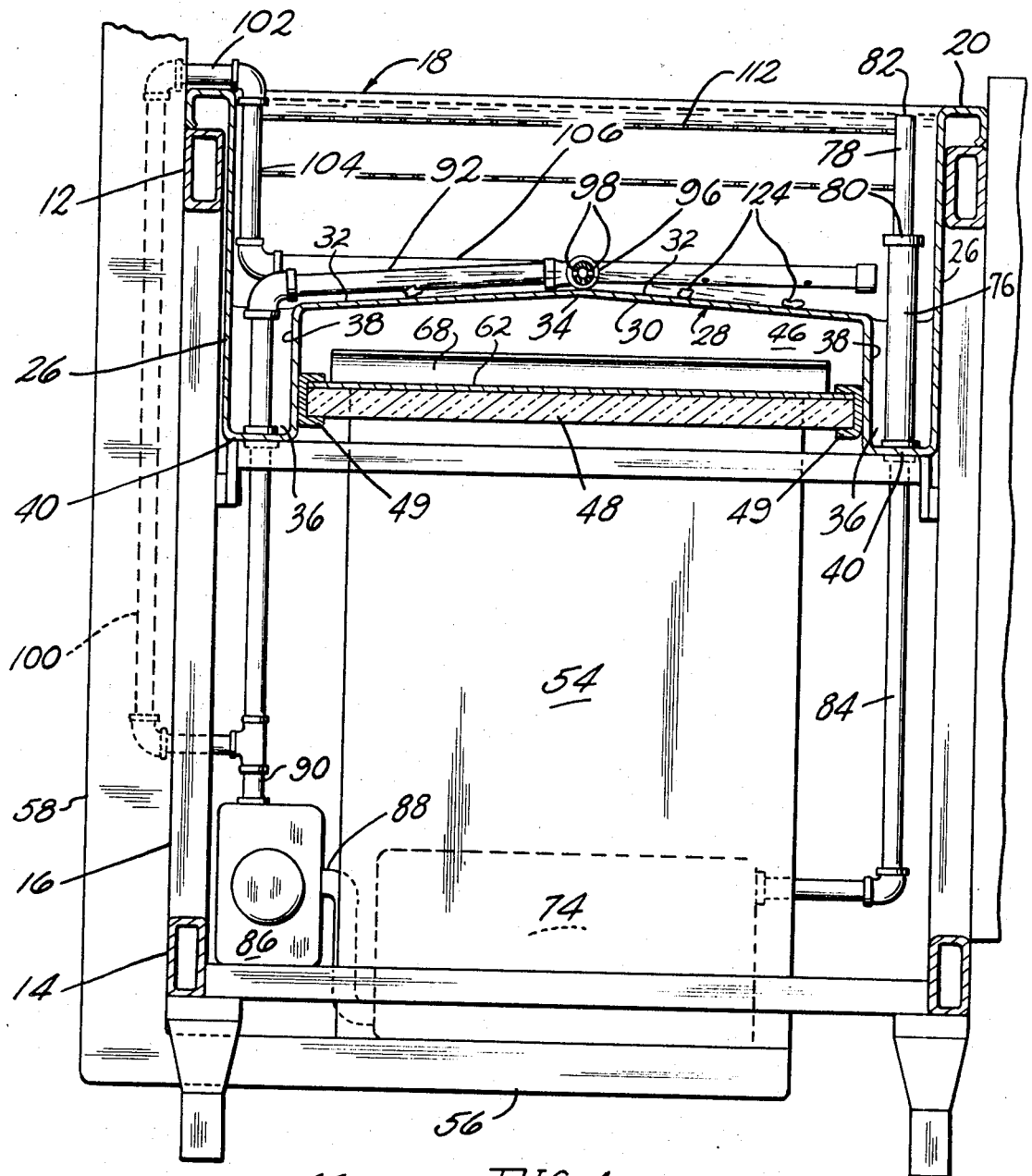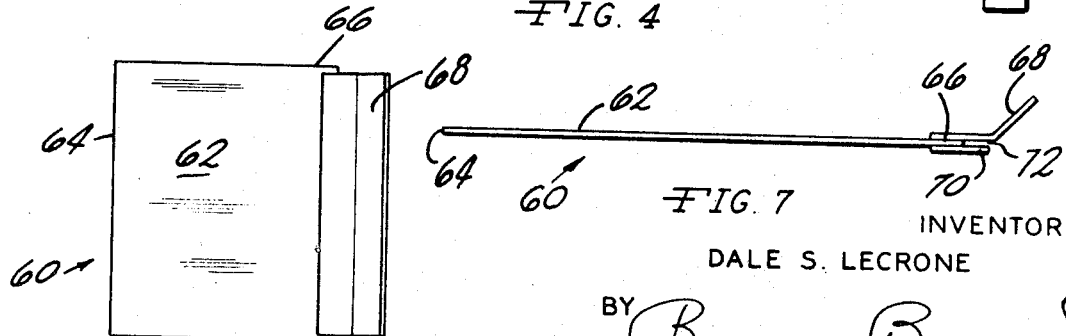

SELF-CLEANING FRYER APPARATUS

BACKGROUND OF THE INVENTION

The invention pertains to the field of frying food in a heated liquid wherein the food is conveyed through the liquid, and apparatus is employed to maintain the heating surface of the receptacle free of food particles.

In high production bakeries frying apparatus is employed wherein the food to be fried, such as donuts, or the like, is conveyed through the fryer, which consists of a large receptacle having a heated frying liquid, such as shortening, located therein. The uncooked food is deposited at one location within the fryer and moved through the fryer to another location at which it is removed, the time required to move from the receiving location to the removing location being that time required to produce the frying. Large scale fryers of this type often handle more than a thousand items an hour and have substantially simplified the frying art with respect to high production cooking. U.S. Pat. Nos. 3,329,081 and 3,340,792 are examples of recent frying apparatus of the aforedescribed type.

In view of the large volume of uncooked food deposited in the frying liquid, and due to the presence of the substantial quantities of food within the fryer at any one time, the accumulation of crumbs and food particles within the fryer can become a problem. The presence of food particles upon the heat transmitting surfaces of the receptacle causes uneven heating of the liquid, which may result in a scorching and burning of the food particles lying upon the heated surface, producing "hot spots" on the heated surface, and a sufficient accumulation of food particles upon the heated surface produces an insulating effect resulting in a low heat transfer efficiency and wasted fuel.

The accumulation of crumbs within large fryers of the automatic type occurs to the largest extent immediately below the location at which the food is introduced into the fryer. Thus, the aforementioned problems arising from the accumulation of food in the fryer are particularly severe at the food receiving end of the fryer. Prior art devices do not show effective means for overcoming the aforementioned problems, and with such devices it is necessary to frequently drain and clean the frying receptacle in order to remove the accumulated food therefrom. Such draining and cleaning of the fryer is time consuming and expensive, resulting in a rather high proportion of "downtime" and interferes with use of the fryer.

Some large fryers use fire tubes located in the frying liquid to heat the liquid. This type of construction is difficult to properly clean, as compared with a "bottom heated" receptacle, and crumbs will accumulate on the heated tubes and decrease the heat transfer efficiency, and it is most difficult to prevent this type of accumulation.

SUMMARY OF THE INVENTION

The invention is directed to a large scale fryer of the automatic type which is free of fire tubes and wherein a conveyor is used to transfer the food to be fried through the fryer and automatic self-cleaning means are employed to maintain the heated surfaces of the fryer free of crumbs and other food particles to insure effective heat transfer to the frying liquid and avoid uneven heat distribution between the heat source and the frying liquid.

The aforementioned purpose is accomplished by utilizing "cold wells" in the fryer receptacle which comprise recessed portions in the receptacle that are not directly heated, and tend to accumulate the cooler frying liquid. The frying liquid is continually recirculated between the frying receptacle and a reservoir whereby the frying liquid removed from the frying receptacle may be filtered and reintroduced into the receptacle. The outlet of the frying liquid circulation means is so positioned relative to portions of the receptacle heated surface that the discharge of the frying liquid "flushes" the heating surface and washes food particles resting thereon into the cold wells. In this manner the heating surface of the receptacle is maintained free of food particles, and no adverse effect is produced with respect to efficiency and operation of the fryer apparatus.

Additionally, the practice of the invention substantially reduces the cleaning and maintenance requirements of the fryer as compared with conventional constructions, reducing the downtime and lengthening the period between receptacle cleaning and draining, and the heating efficiency of the fryer remains uniform regardless of the amount of food fried therein and the duration of operation.

In the practice of the invention removal of the accumulated food particles from the cold wells is possible without interrupting the operation of the fryer wherein continuous production operation is feasible.

In order to assure a most effective application of the heating means, preferably gas, to the heated surface of the receptacle, the fryer includes a heating chamber having baffles defined therein for "scrubbing" the hot gases against the portion of the receptacle to be heated. The heating chamber is provided with a plurality of interconnecting baffles which may be readily assembled and replaced for easy maintenance and the simplified construction of the baffles provides an effective yet inexpensive construction.

BRIEF DESCRIPTION OF THE DRAWINGS

The aforementioned objects and advantages arising from the practice of the invention will be appreciated from the following description and accompanying drawings wherein:

FIG. 1 is an elevational view, partly sectioned, illustrating a fryer in accord with the invention, FIG. 2 is a top, plan view, partly sectioned, of a fryer in accord with the invention, FIG. 3 is an elevational, end view as taken from the right of FIG. 1, the conveyor drive mechanism being removed for purpose of illustration, FIG. 4 is an elevation, sectional view as taken through the fryer apparatus in accord with the invention along Section IV—IV of FIG. 2, FIG. 5 is an elevational sectional view taken along Section V—V of FIG. 2, FIG. 6 is a plan view of the baffle used in the heating chamber of the fryer, and FIG. 7 is an elevational view of the baffle of FIG. 5.

DESCRIPTION OF THE PREFERRED EMBODIMENT

The fryer apparatus includes a framework generally indicated at 10 which may consist of a plurality of stainless steel beams having a rectangular cross section welded together to form generally rectangular upper and lower portions 12 and 14, respectively, supported in spaced vertical relationship by a plurality of vertical column and leg members 16.

The upper frame portion 12 serves to directly support the elongated frying liquid receptacle generally indicated at 18. This receptacle includes an upper edge 20 formed in a boxlike configuration, FIG. 4, ends 22 and 24, sidewalls 26 and a bottom generally indicated at 28.

The bottom 28 of the receptacle consists of several regions or portions in the practice of the inventive concept. The central portion 30 of the receptacle 18 forms a heating portion which extends substantially the length of the receptacle, FIG. 2, and is defined by flat surfaces 32 angularly related to each other intersecting at an apex or peak at 34, FIG. 4. The surfaces 32 thereby slope away from the peak 34 on a gentle slope as is apparent.

Adjacent the sidewalls 26, recessed portions or wells 36 are formed in the receptacle bottom, and these wells are defined by walls 38, substantially parallel to and spaced from receptacle sidewalls 26, and a bottom wall 40. The recesses 36 form "cold wells" extending substantially the length of the receptacle, FIG. 2, and are thus disposed upon each side of the receptacle central heating portion 30. In that the walls 38 gently merge with the surfaces 32 food particles upon the heating surfaces 32 may enter the cold wells without hindrance, as will be later described.

Although it is not necessary to the practice of the invention, the depth of the wells 36 may increase toward one end of the receptacle, as in FIG. 1 whereby the cold wells increase in depth toward end 22 and may be drained through openings 42 formed in each well communicating with valved drain conduits 44. It is to be noted that the depth of the cold wells with respect to the volume of the receptacle is such that a rather large quantity of food particles can be received within the cold wells before they would reach a depth equal to the lowest portion of the heating surfaces 32.

Heating of the frying liquid within the receptacle 18 is accomplished by means of a heating chamber 46 formed immediately below the receptacle bottom central portion 30. The heating chamber 46 is of an elongated configuration extending the length of the receptacle and may be closed at the bottom by an insulated panel 48 received in brackets 49. In the disclosed embodiment a bank of gas burners 50 are located at each end of the fryer wherein hot gases are introduced into the heating chamber 46 from each end thereof. The gas burner units 50 consist of a plurality of gas and air mixing chambers which introduce the mixture into the chamber 46 ends where it is ignited at the burner nozzles, and the hot gas flow is toward the center of the fryer with respect to the ends 22 and 24. A vent 52 communicates with the heating chamber 46, and communicates with a rectangular duct which extends downwardly at 54 and to the right horizontally at 56, FIG. 1, for communication with a stack 58 extending vertically upward along one side of the fryer. The stack 58 will be affixed by duct work, not shown, to a powered venting system whereby the vacuum maintained on the venting system will draw the heated gases through the vent 52 and through duct portions 54 and 56 into the stack. Preferably, the vent 52 will be located closest to the end of the fryer at which the food enters the receptacle and the greatest amount of heat is introduced into the heating chamber at this end as it is most rapidly absorbed by the food.

In order to increase the efficiency of the heat transfer between the hot gases in chamber 46 and the receptacle 18, a baffle system is located within the heating chamber. This baffle system includes a plurality of baffle members 60 interconnected in such a way that the baffle members may be readily assembled or replaced for cleaning, removal and reassembly.

The baffle members 60 are best shown in FIGS. 6 and 7 and each includes a flat base portion 62 having a width substantially equal to that of panel 48. The base portion 62 includes an end 64, and the opposite end 66 of the base member portion has affixed thereto a deflecting portion 68 which extends upwardly toward the underside of the central portion 30, but are somewhat spaced therefrom whereby hot gases passing over the top of the base portions 62 will be deflected upwardly and "scrub" the underside of surfaces 32. The base portion ends 66 also include a metal retainer 70 affixed to the underside thereof, FIG. 7, whereby a space 72 exists between the horizontal portion of the deflector 68 and retainer 70 which forms a recess into which the edge 64 of the adjacent baffle base portion may be received. In this manner a plurality of baffles 60 may be assembled, as shown in FIGS. 1 and 5 in end to end relationship. The flow of the hot gases as they pass over the baffle deflecting portions 68 and bases 62 cause a turbulence and "scrubbing" which produces an effective heat transfer between the gases and the receptacle.

The frying liquid normally used with this type of frying apparatus is a shortening or similar cooking oil which is capable of being maintained at a frying temperature by the heating chamber. This oil is continuously circulated between a reservoir and the receptacle whereby the oil may be continually filtered and cleaned, and may be discharged in such a manner as to keep the heated portions of the receptacle bottom free of crumbs and other food particles deposited thereon during the fryer operation. Preferably, the frying liquid reservoir 74 is mounted upon the horizontal portion 56 of the vent duct whereby the heat within the gases removed from the heating chamber 46 by the vent 52 will aid in maintaining the liquid within the reservoir at a relatively high temperature. The reservoir is supplied from an overflow located within the receptacle, FIG. 4. In the disclosed embodiment the overflow includes a fixed standpipe portion 76 extending from the base 40 of the right cold well 36 which is of a diameter capable of telescopically receiving the upper standpipe portion 78 in an adjustable manner. Adjusting means generally indicated at 80 permit the standpipe 78 to be raised and lowered with respect to the standpipe 76 and thereby vary the depth of the frying liquid within the receptacle 18. The upper end 82 of the standpipe 78 is open whereby the vertical position of the end determines the depth of the liquid within the receptacle. By means of conduit 84 the liquid entering the standpipe 78 flows into the reservoir.

The frying liquid is introduced into the reservoir 18 by means of a pump system which includes a pump 86 having a conduit 88 communicating with the reservoir, FIG. 4. The outlet conduit 90 of the pump sealingly extends through the bottom wall of the left cold well 36 and is attached to an elbow which in turn is affixed to the pipe section 92, elbow 94 and conduit 96.

The conduit 96 extends substantially one-half of the length of the receptacle 18, and extends toward the receptacle end 22, FIG. 2 and is closed at its end. The conduit 96 is disposed upon the apex 34 of the central heating portion 30 whereby equal areas of heating portion surfaces 32 are disposed on each side thereof. A plurality of discharge openings 98, FIG. 4, are formed in the conduit 96 on opposite sides thereof, and the openings upon the same side of the conduit are axially displaced whereby a plurality of openings exist disposed toward each of the cold wells 36.

Adjacent the right end 24 of the receptacle 18 a variation in the frying liquid flushing arrangement is illustrated. This arrangement includes a supply conduit 100 connected to outlet conduit 90 which extends upwardly outside of the receptacle over the receptacle edge at 102, down into the receptacle at 104 and conduit 106 extends across the central portion 30 at right angles to the length of the receptacle and is closed at its free end.

The conduit 106 includes a plurality of openings 108 which extend in both directions from the conduit across the surfaces 32, and a plurality of openings 110 extend downwardly on the surfaces 32. If desired, a plurality of conduits 106 can be used in a receptacle and in such case the conduits 106 would be parallel to each other and spaced apart in the direction of the length of the receptacle.

The movement of food through the receptacle 18 is accomplished by means of the wire, endless conveyor 112 which is mounted upon a drive roller 114, and an idler roller 116. The drive roller 114 is mounted at the discharge or removing end of the conveyor and roller 116 is mounted at the conveyor receiving end. The roller 114 includes a chain sprocket to which the drive chain 118 is mounted, which is also mounted upon the drive shaft associated with the motor and transmission means 120 for rotating the drive roller and thereby moving the conveyor through the receptacle.

As will be apparent from FIG. 4, in the illustrated embodiment, the depth of the liquid within the receptacle 18 would be slightly above the upper portion of the conveyor 112 whereby donuts or the like can be moved through the fryer. If desired, "turnover" apparatus may be incorporated in the receptacle to turn over the article of food being cooked approximately half way through the cooking process.

In operation, the gas burning units 50 are ignited, and control means 122 insure accurate temperature regulation of the liquid within the receptacle 18 at all times. The energization of the pump 86 introduces frying liquid into the receptacle through the discharge openings of the conduits 96 and 106, and this liquid is withdrawn from the receptacle by the inlet standpipe 78 at its upper end 82. The conveyor motor 120 is energized and the conveyor 112 is moved such that the upper portion of the conveyor will be moving toward the right as viewed in FIG. 1. The food articles to be fried are deposited upon the conveyor adjacent the receptacle end 22 at roller 116 by conventional transfer mechanism, not shown. As these food particles are deposited upon the conveyor 112, and enter the hot frying oil, crumbs and other food particles will fall therefrom through the conveyor and be deposited upon the receptacle bottom portion surfaces 32. However, due to the flow of the frying liquid into the receptacle 18 through the conduit openings 98 such food particles, as indicated at 124, FIG. 4, are quickly "flushed" toward the adjacent cold well 36. Thus, in this manner the heated portion 30 is maintained free of crumbs and other food particles insuring an efficient heat transfer through the heated central portion 30 into the receptacle.

The foods continue their travel through the fryer upon the conveyor 112 whereby they are removed adjacent the end 24 by conventional transfer mechanism, not shown, for packaging or other processing.

Crumbs which fall to the central bottom portion 30 adjacent the receptacle end 24 will be flushed into the cold wells 36 by the frying liquid being ejected through the openings 108 and 110 of conduit 106. While the fluid emitting from the openings of conduit 106 is not directly oriented toward the cold wells 36, as is the liquid passing from openings 98, the slope of surfaces 32 will cause the food particles to be effectively flushed into the cold wells.

By introducing the frying liquid upon the central portion 30 a rapid heating of the frying liquid being introduced into the receptacle is also produced, in addition to the flushing action accomplished. In that the frying liquid being drawn from the reservoir 74 is directly imposed upon the heated surfaces 32 of the central portion 30 an effective heat transfer between the heating chamber and the newly introduced liquid is accomplished.

The drain openings 42 at the lower end of the cold wells 36 are of such a size as to readily permit the cooler frying liquid to be drained therefrom, and by opening these drains momentarily the accumulation of food particles in the cold wells can be quickly removed with only a momentary loss in the level of the fryer receptacle liquid. It is also possible to only partially open the drains and permit the cold wells to be effectively flushed of particles without losing the level within the fryer receptacle as long as the liquid is not drained from the receptacle at a faster rate than it is introduced by the pump 86.

In the disclosed fryer two different flushing arrangements are shown, for purpose of illustration. In actual practice a fryer constructed in accord with the invention would usually either employ the "parallel" conduit arrangement of conduit 96 or the "transverse" arrangement of conduit 106. Each arrangement is effective to accomplish the "flushing" action desired.

As the majority of food particles fall to the surfaces 32 adjacent the receiving end of the conveyor it is most important that the liquid flushing arrangement be disposed at this area. With fryers of considerable length it may not be necessary to locate the flushing arrangement at the conveyor removal end of the receptacle, and the arrangement of the apparatus of the invention permits the liquid flushing and inlet openings to be positioned at those fryer locations which are most advantageously utilized.

From the aforedescribed it will be appreciated that the invention is directed to a frying apparatus which is self-cleaning and capable of maintaining the heated surfaces free of crumbs and other food particles. The fryer apparatus of the invention requires a minimum of maintenance and care and by continuously removing the food particles from the heated portion 30 as soon as they are deposited thereon uneven heating characteristics due to the presence of the food particles are eliminated, and no insulation barrier can occur between the heating chamber and the liquid within the receptacle.

The cold wells 36 are of such depth that the temperature of the liquid therein will be less than the temperature of the liquid adjacent the liquid surface. Thus, the presence of the cold wells permits a substantially uniform liquid temperature adjacent the surface of the liquid, where the frying occurs, and the introduction of the frying liquid through the conduits 96 and 106 does not cause currents or adverse agitation of the frying liquid within the receptacle.

It is appreciated that various modifications to the inventive concept may be apparent to those skilled in the art without departing from the spirit of the invention, and it is intended that the invention be confined only by the scope of the following claims.

I claim:

1. A self-cleaning food fryer for frying foods in a heated liquid comprising, in combination, an elongated frying receptacle having lateral sidewalls and a bottom, said bottom including a heating portion and an elongated recessed portion extending below said heating portion defining a cold well and disposed adjacent a sidewall, heating means disposed below said heating portion, said bottom heating portion being of an elongated configuration extending the length of said recessed portion, frying liquid circulation means including an elongated conduit within said receptacle extending substantially parallel to said heating portion, and a plurality of discharge openings defined in said conduit axially spaced therealong and disposed toward said recessed portion, whereby said heating portion is flushed by the liquid discharged from said openings and foreign matter thereon is deposited in said recessed portion.

2. A self-cleaning food fryer as in claim 1 wherein a receptacle recessed portion is defined adjacent each lateral sidewall and said heating portion comprises the central portion of said receptacle, said conduit being disposed at the center of said heating portion and said discharge openings being disposed toward both recessed portions.

3. A self-cleaning food fryer as in claim 2 wherein said receptacle includes first and second ends, a conveyor located within said receptacle having a receiving portion adjacent said first end and a discharge portion adjacent said second end, said conduit disposed below said conveyor receiving portion, a portion of said discharge openings being disposed across said heating portion toward one of said recessed portions and a portion of said openings being disposed across said heating portion toward the other recessed portion.

4. A self-cleaning fryer as in claim 3 wherein a heating chamber is defined below said receptacle heating portion intermediate said recessed portions, gas burner means located on said fryer at said receptacle first end within said heating chamber and a plurality of baffles defined in said heating chamber including deflecting portions disposed toward said heating portion to deflect the hot gases in to contact with the heating portion.

5. A self-cleaning fryer as in claim 4 wherein said baffles comprise a plurality of interconnected segments, each segment including a base portion substantially parallel to said heating portion and a deflecting portion angularly disposed to the associated base portion, each segment including a male end and a female end adapted to connect to the female and male ends, respectively, of the adjacent segments.

6. A self-cleaning food fryer for frying foods in a heated liquid comprising, in combination, an elongated frying receptacle having lateral sidewalls and a bottom, said bottom including a heating portion and an elongated recessed portion extending below said heating portion defining a cold well and disposed adjacent a sidewall, heating means disposed below said heating portion, said bottom heating portion being of an elongated configuration extending the length of said recessed portion, said bottom heating portion being disposed obliquely to the horizontal in the direction transverse to the length of said receptacle inclined downwardly toward said recessed portion, frying liquid circulation means including a conduit transversely extending across the length of said heating portion, and a plurality of discharge openings defined in said conduit disposed across said heating portion for discharging frying liquid in the general direction of the length of said heating portion whereby said heating portion is flushed by the liquid discharged from said openings and foreign matter thereon is deposited in said recessed portion.

7. A self-cleaning food fryer for frying foods in a heated liquid comprising, in combination, an elongated frying receptacle having lateral sidewalls and a bottom, said bottom including a heating portion and an elongated recessed portion extending below said heating portion defining a cold well and disposed adjacent a sidewall, heating means disposed below said heating portion, said bottom heating portion being of an elongated configuration extending the length of said recessed portion, said bottom heating portion including a pair of substantially planar surfaces obliquely disposed to the horizontal intersecting at a peak defining a ridge extending the length of said heating portion, each of said planar surfaces being inclined downwardly toward an adjacent receptacle sidewall, a recessed portion defined adjacent each of said sidewalls for receiving food particles from its adjacent planar surface, frying liquid circulation means including a conduit transversely disposed to the length of said ridge extending across said planar surfaces, and a plurality of discharge openings defined in said conduit for discharging frying liquid in the general direction of the length of said planar surfaces whereby said heating portion is flushed by the liquid discharge from said openings and foreign matter thereon is disposed in said recessed portion.